Dec. 17, 1940.     H. J. MURPHY     2,225,594
KNOB FASTENER AND ASSEMBLY
Filed April 9, 1940
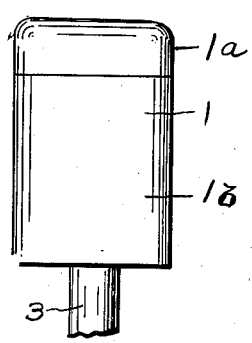
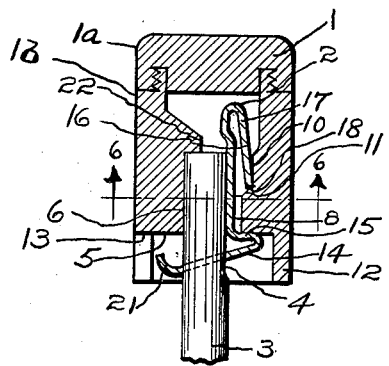
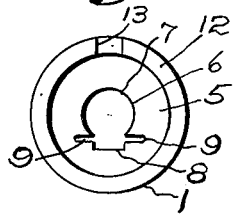
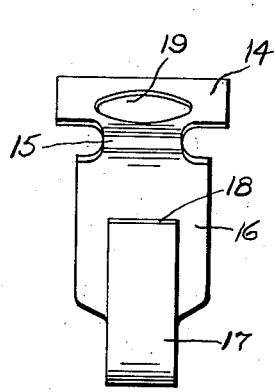
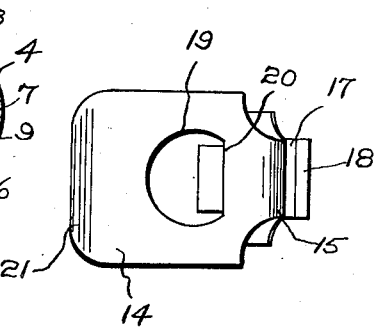
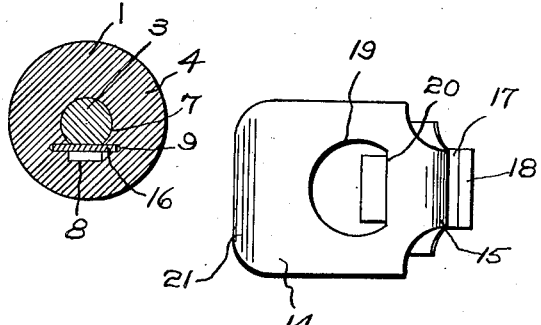
Inventor:
Howard J. Murphy.
By John Todd
Att'y.

Patented Dec. 17, 1940

2,225,594

UNITED STATES PATENT OFFICE 2,225,594

KNOB FASTENER AND ASSEMBLY

Howard J. Murphy, Greenwood, Mass., assignor to United-Carr Fastener Corporation, Cambridge, Mass., a corporation of Massachusetts Application April 9, 1940, Serial No. 328,722

2 Claims. (Cl. 287—53)

This invention relates to fastener installations wherein a fastener member is secured in assembly with an article of manufacture, such as a knob, for securing a shaft thereto.

Referring to the drawing, in which I have illustrated a preferred embodiment of my invention:

Fig. 1 is a front elevation showing a shaft member secured in assembly with a knob member;

Fig. 2 is a longitudinal sectional view of the installation shown in Fig. 1;

Fig. 3 is an end view of the knob member before attachment of the fastener member thereto;

Fig. 4 is a side elevation of my improved fastener member per se;

Fig. 5 is a top plan view of the fastener member shown in Fig. 4; and

Fig. 6 is a sectional view taken along the line 6—6 of Fig. 2.

This invention relates to improvements in knob devices preferably of the type used on automobile instrument panels as finger operative means for actuating switches and the like. The chief aim of my invention is the provision of a knob installation wherein a fastener member may be quickly and easily assembled with the knob member for the purpose of detachably securing a shaft member to the knob. Referring to the installation shown in Figs. 1-4, I have shown an article of manufacture such as the knob 1, which may be of steel, plastic, glass or the like, to which is secured my improved fastener member 2. A shaft member 3, which connects the finger operative knob means 1 with a suitable part of automobile apparatus, extends into the knob and is gripped by the fastener member 2 so as to be secured in assembly with the knob. The shaft member 3 preferably has a flat side 4 cooperating with the knob in a manner to prevent relative rotation of the parts, as will be hereinafter more fully described.

The knob member 1 in its simplest form, as shown in the drawing, has a cap 1ᵃ at one end in screw threaded relation with the knob body 1ᵇ. The opposite end of the knob body from that to which the cap is attached has an end face 5. An irregular opening in the form of a bore 6 (Fig. 3) extends from the end face 5 into the bore of the knob, as most clearly shown in Fig. 3. The opening 6, in my preferred form, has a cross-sectional shape substantially as shown in Fig. 3 and comprises a shaft-receiving opening 7 adapted to embrace the end of the shaft member 3 and a second opening 8 adjacent one side of the opening 7 for receiving attaching means of the fastener member. Thus the openings 7 and 8 are substantially keyhole-shaped in cross-section with the opening 7 substantially circular except at its margin adjacent the opening 8. Relatively narrow openings 9 intersect the opening 8 and extend laterally outwardly from opposed sides thereof. The opening 8 extends a predetermined distance from the end face 5 into the knob and then widens out as at 10 (Fig. 2) so as to form an abutment 11 in the knob member which faces away from the end face 5. The narrow openings 9—9 are adapted to receive and hold an attaching means of the fastener member 2 for aiding to secure the fastener member to the knob. The knob member 1 preferably has a peripheral wall 12 extending beyond the end face 5 of the body portion of the knob and adapted to conceal the fastener member 2. The wall 12 has an opening 13 in the side thereof to permit entrance of a tool through the wall into engagement with a releasing portion of the fastener member for detaching the knob member from the shaft.

The fastener member 2 is preferably formed of one piece of sheet metal material and has a spring plate portion 14 at one end. Integral with an edge of the plate 14 I have provided a return-bend portion 15 extending beneath one side of the plate and preferably spaced from the plate so as to give resiliency to the plate portion, as will be understood by those skilled in the art, and at the same time engage the end face 5 to limit movement of the fastener axially into the knob member. An attaching means 16 extends outwardly from the free end of the return-bend portion 15 and is adapted to enter the narrow openings 9—9 of the bore 6 during attachment of the fastener member to the knob. Integral with the free end of the attaching means 16, in my preferred form, I have provided a resilient tongue 17 which is folded back in relation to the attaching means 16 and preferably disposed on the same side of the fastener as the return-bend portion 15. The tongue 17 has a free end portion 18 for engagement behind the abutment 11 when the parts are in final assembly thereby to limit axial withdrawal of the fastener from the knob.

The spring plate 14 has an aperture 19 therein for receiving an end of the shaft member 3 and the plate is inclined relative to the end face 5 of the body of the knob so that in expanded position it may grip the shaft member by canted action (Fig. 2). The aperture 19 has a flat side 20 which cooperates with the flat side 4 of the shaft member 3 to prevent relative rotation of the parts when the same are in fastened relation. At the opposite end of the plate 14 from that with which the return-bend portion 15 is integral I have provided an ear-shaped releasing portion 21 which curves out of the plane of the plate 14 in the direction of the end face 5. The curved construction of the releasing portion forms a camming surface which is engageable by a tool inserted through the opening 13 of the wall 12 to start contraction of the plate 14 for releasing the fastener from the shaft member.

Assembly of the parts of my installation is carried out through moving the fastener member into the knob member through the end face 5 with the attaching means 16 disposed within the narrow openings 9—9 and the tongue 17 seated within the opening 8. As a result of the fact that the tongue 17 is normally spaced a greater distance from the attaching means 16 than the width of the opening 8, the tongue 17 is contracted during passage through the opening 8 and after the free end 18 has passed through the opening into the wider opening 10, the tongue expands to engage the free end 18 behind the end face 5 of the knob. Thus the return-bend portion 15 and the tongue 17 cooperate with the knob to limit axial movement of the fastener member relative to the knob when the fastener is in final assembled position. At the same time disposition of the attaching means 16 within the narrow openings 9—9 maintains the fastener member in position against lateral movement relative to the knob.

When the fastener member is secured to the knob, the plate portion 14 is in inclined relation to the face 5 with the opening 6 slightly out of alignment with the shaft-receiving opening 7 of the knob. The plate 14 is contracted during passage of the shaft member 3 through the opening 19 whereby the opening 19 aligns with the opening 7 of the knob so as to permit the free end of the shaft 3 to extend through the spring plate into the bore of the knob. It will be noticed that the flat side 4 of the shaft member is disposed adjacent the imaginary line along the intersection of the opening 8 with the opening 7 when the shaft is secured within the knob, as most clearly shown in Fig. 6. The knob 1 may have a projection 22 extending into the passage of the opening 7 a predetermined distance from the end face 5 to limit passage of the shaft into the knob, as most clearly shown in Fig. 2. After relaxing the pressure upon the shaft member for moving it through the plate 14 of the fastener into the bore of the knob, the plate expands to engage the shaft by a canting action. The shaft member is now securely attached to the knob and may not be released until the plate 14 has been contracted sufficiently to align the aperture 19 of the plate and the opening 7 of the bore.

Thus by my invention I have provided a fastener installation of simple construction whereby a fastener member may be quickly and easily assembled with the knob member so as to prevent any chance of separation of the parts during normal usage of the knob.

Although I have illustrated and described a preferred embodiment of my invention, I do not wish to be limited thereby because the scope of my invention is best defined by the following claims.

I claim:

1. A fastener installation comprising an article of manufacture, a fastener member assembled with said article and a shaft member, said article having a bore extending inwardly from one end and said bore being wider a predetermined distance from said end providing an abutment facing away from said end, said fastener member having a yieldable portion seated within said bore and having a shoulder portion seated behind said abutment for attaching said fastener to said article, and said fastener having an apertured plate portion gripping said shaft as when biased with respect to a transverse plane through said shaft.

2. A fastener installation comprising an article of manufacture, a fastener member assembled with said article and a shaft member, said article having a shaft-receiving opening and a second opening for receiving an attaching means of said fastener member, said article having relatively narrow openings adjacent said second opening extending laterally from opposite sides thereof, said openings extending inwardly from an end of said fastener and said second opening being wider a predetermined distance from said end providing an abutment facing away from said end, said fastener member having a spring portion at one end seated within said second opening and engaging said article behind said abutment thereby to maintain said fastener against axial movement, an apertured resilient plate portion at the other end disposed opposite the shaft-receiving opening of said article, said shaft extending through the aperture of said plate portion and into said shaft-receiving opening of said article, and said plate frictionally engaging said shaft for securing the fastener and shaft together, and an attaching means integrally joining said spring portion and said plate portion, said attaching means being seated within said narrow openings thereby to maintain said fastener against lateral movement.

HOWARD J. MURPHY.